United States Patent
Hardacker et al.

(10) Patent No.: US 7,879,111 B2
(45) Date of Patent: Feb. 1, 2011

(54) SYSTEM AND METHOD FOR RFID TRANSFER OF MAC, KEYS

(75) Inventors: Robert Hardacker, Escondido, CA (US); Edgar Allan Tu, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1126 days.

(21) Appl. No.: 11/591,922

(22) Filed: Nov. 2, 2006

(65) Prior Publication Data

US 2008/0109654 A1    May 8, 2008

(51) Int. Cl.
*H04L 29/06* (2006.01)
*G06F 21/00* (2006.01)

(52) U.S. Cl. .................................... 726/35; 380/52

(58) Field of Classification Search ............. 713/159, 713/186, 193–194, 171; 380/270, 278–279, 380/286, 262, 264, 52; 726/34–35
See application file for complete search history.

(56) References Cited

U.S. PATENT DOCUMENTS

| | | | |
|---|---|---|---|
| 5,805,204 A * | 9/1998 | Thompson et al. ............ 725/48 |
| 6,782,260 B2 * | 8/2004 | Nakakita et al. ........... 455/435.1 |
| 2003/0110512 A1 | 6/2003 | Maari .......................... 725/131 |
| 2003/0130906 A1 | 7/2003 | Maari ............................ 705/26 |
| 2004/0073451 A1 | 4/2004 | Maari ............................. 705/1 |
| 2004/0076300 A1* | 4/2004 | Ishidoshiro ................. 380/277 |
| 2004/0107167 A1 | 6/2004 | Maari ............................ 705/57 |
| 2004/0268132 A1 | 12/2004 | Waris .......................... 713/185 |
| 2005/0015467 A1 | 1/2005 | Noda ........................... 709/220 |
| 2005/0105734 A1 | 5/2005 | Buer et al. ................... 380/270 |
| 2005/0201557 A1* | 9/2005 | Ishidoshiro .................. 380/44 |
| 2005/0253722 A1 | 11/2005 | Droms ...................... 340/572.1 |
| 2007/0066221 A1* | 3/2007 | Shim et al. ................. 455/41.2 |

FOREIGN PATENT DOCUMENTS

WO    WO 01/171685 A1    9/2001

* cited by examiner

*Primary Examiner*—Gilberto Barron, Jr.
*Assistant Examiner*—Venkat Perungavoor
(74) *Attorney, Agent, or Firm*—John L. Rogitz

(57) ABSTRACT

Network registration for a device is achieved by providing the device with an RFID chip bearing a MAC address, cryptographic capabilities and keys, and then disposing the device near a registration server (such as a home network server/server TV) to cause the information on the RFID chip to be automatically transferred to the server and thus execute registration of the device on the network automatically, relieving a person from having to enter long strings of numbers.

20 Claims, 3 Drawing Sheets

OVERALL FLOW

REGISTRATION

SYSTEM AND METHOD FOR RFID TRANSFER OF MAC, KEYS

FIELD OF THE INVENTION

The present invention relates generally to systems and methods for RFID/Near Field Communications (NFC) applications.

BACKGROUND OF THE INVENTION

Attaching new devices such as new digital video disk (DVD) players or digital video recorders (DVRs) to a network such as a home entertainment network can be a trying experience even for engineers, let alone the customers for whom these products are intended. This is because network registration can entail entering long strings of alpha-numeric characters for IP addresses, wired equivalent piracy (WEP) keys, etc.

An additional problem of transferring data securely is setting up the initial transactions which often means sending some information in the clear. Sometimes this is a "public key" or seed which, if the other side uses the same algorithm, produces a real encryption key. However, if the algorithm is known, the system is compromised during the clear text transmission.

With the above recognitions in mind, the present invention is provided.

SUMMARY OF THE INVENTION

A method is disclosed for registering a device in a network. The method includes embedding a MAC address and an encryption data unit on a RFID tag, and engaging the RFID tag with a device. Then, the device is positioned sufficiently close to a network registration component that has an associated RFID writer/reader to enable the writer/reader to obtain the MAC address and encryption data unit.

In non-limiting implementations the encryption data unit can be a WEP key, a WEP seed, or a shared secret useful for generating a WEP seed. DES keys, 3DES keys, AES keys, and other methods can also be used. In general, a key associated with any one of these encryption methods is referred to herein as a "variable encryption data unit". The writer/reader may be mounted on a housing of the registration component or it may be tethered to a housing of the registration component by a cable. If desired, a visual aid can be provided for indicating an approximate location of the RFID tag within a case of the device.

In another aspect, a device for a network includes a case and an RFID tag in the case. The RFID tag bears a MAC address unique to the device and an encryption data unit. The tag is readable by a RFID writer/reader to enable a network registration component to obtain the MAC address and encryption data unit to permit registration of the device on the network.

In still another aspect, a registration component for automatically registering a device with a network without requiring a user to enter a device ID or key into the component includes a housing, a processor in the housing, and an RFID writer/reader engaged with the housing and connected to the processor. With this combination of structure, a MAC address and an encryption data unit can be obtained from an RFID tag on the device. The processor uses information from the reader/writer to register the device on the network.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
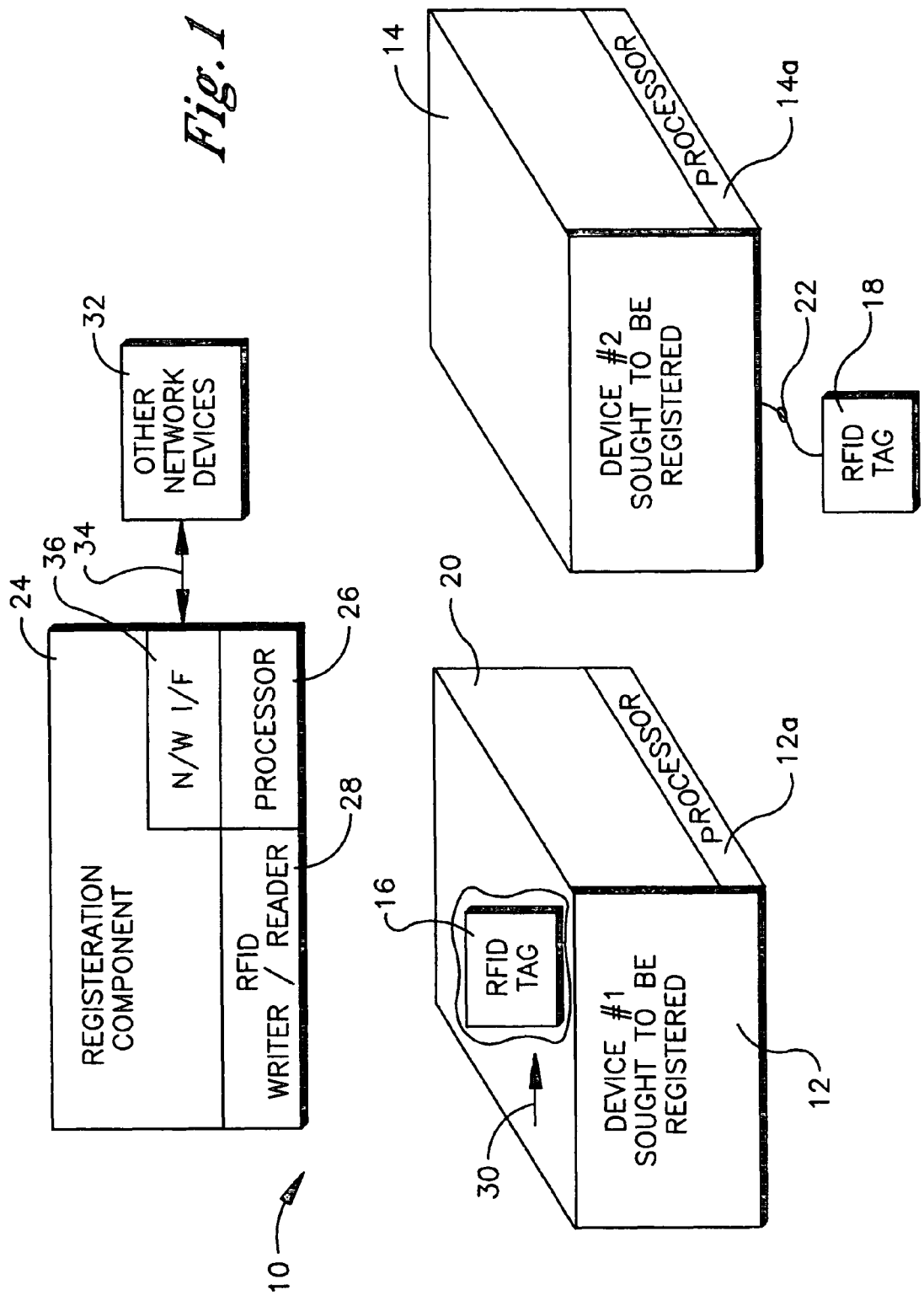
FIG. 1 is a block diagram of a non-limiting system in accordance with the present invention, with portions of the first device sought to be registered cut away for clarity.

Referring initially to FIG. 1, a system is shown, generally designated 10, for registering new devices 12, 14 preferably having respective processors 12, 14a with an existing network using RFID proximity principles. As shown in FIG. 1, each device 12, 14 has a respective RFID tag 16, 18 such as but not limited to a Sony "Felica" chip (also known as a "SUICA" chip) that can be mounted inside or attached to the case 20 of a device sought to be registered (as is the case with the first device 12) or that can be physically separate from the case and connected to the device via a cable 22 such as a universal serial bus (USB) cable (as is the case with the second device 14).

In either case, a device 12, 14 sought to be registered can be disposed adjacent to a registration component 24 such as a server computer or server TV with server processor 26. The registration component includes or has tethered to it (via, e.g., a universal serial bus (USB) cable) an RFID writer/reader 28, and the RFID writer/reader 28 sends data to the processor 26. A visual aid 30 can be provided on the case 20 of a device 12 sought to be registered indicating the location of an interior RFID tag 16 to aid a person in closely juxtaposing the tag 16 with the writer/reader 28 of the registration component 24.

The device 12, 14 sought to be registered can be any appropriate device, including a portable or wireless device such as a remote commander or a device such as a DVD player or DVR that is connected to a server through wires or wirelessly, e.g., using an Ethernet connection, an i.LINK connection, a USB connection, a coaxial cable, etc. Thus, in some implementations the device sought to be registered may be a portable device such as a wireless device utilizing another long range communication link not used in the registration process. The registration component 24 typically is connected to other network devices 32 via a network 34 and network interface 36. The network 34 can be a home network implemented as an 802.11 network, powerline communication network, Ethernet, or other suitable network backbone.

Figure 2:
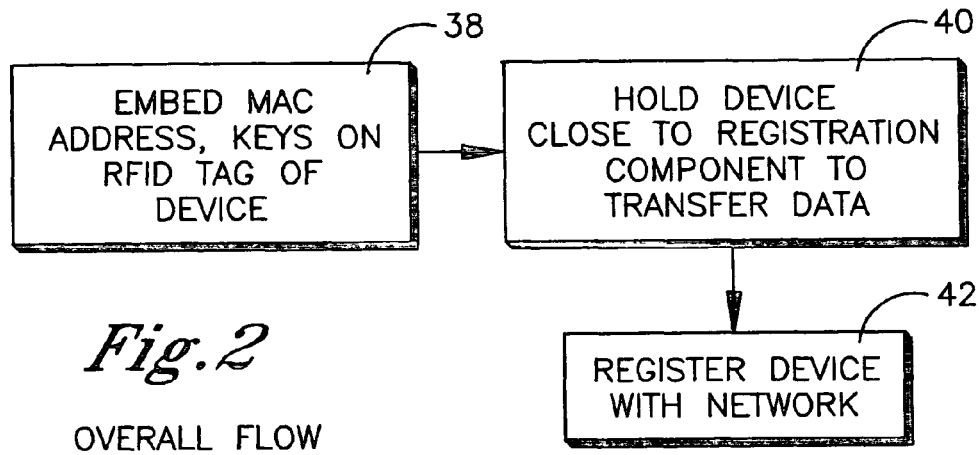
FIG. 2 is a flow chart of the overall logic for registering a device on a network using radiofrequency identification (RFID)

Now referring to FIG. 2 and using the first device 12 sought to be registered as an example, at block 38 a unique device identification, preferably a media access control (MAC) address, is embedded in the RFID tag 16. Also embedded in the RFID tag 16 are encryption data units such as encryption keys, preferably WEP keys and/or authentication keys as well as authentication certificates and/or seeds and/or encryption capabilities to enable a shared trusted algorithm to calculate a secure key (or the next secure key).

Proceeding to block 40, the device 12 is held close enough to the registration component 24 to transfer the data on the RFID tag 16 of the device 12 to the RFID writer/reader 28

(and thence to the processor 26) of the registration component 24. This can be done in accordance with RFID principles without powering up the device 12 (and in an inherently secure transmission mode, given the short range of RFID communication) to remove the effort from the customer to manually enter the data into the registration component 24. At block 42, using the transferred information including the unique MAC address of the device 12, the device 12 is registered with the network by the registration component 24 to enable network members to encrypt communications to and from each other with the exception of the fixed MAC addresses of each component, which can be transferred in the clear, because without the key(s) all other communications are unfathomable.

By "RFID" is meant any suitable short-range Radio Frequency Identification (which is also referred to as "Near Field Communications" (NFC)) in which an unpowered tag may be "read" by a writer/reader. Specific RFID implementations may be known under various tradenames such as "Felica" and "Mifare" and typically defines a technology consisting of two basic components: an active reader/writer and a passive component device, herein referred to as a tag. A reader/writer transmits a wireless signal to the tag. The tag harvests energy contained in the transmission to power its circuitry enabling the tag to respond to the reader/writer.

Figure 3:
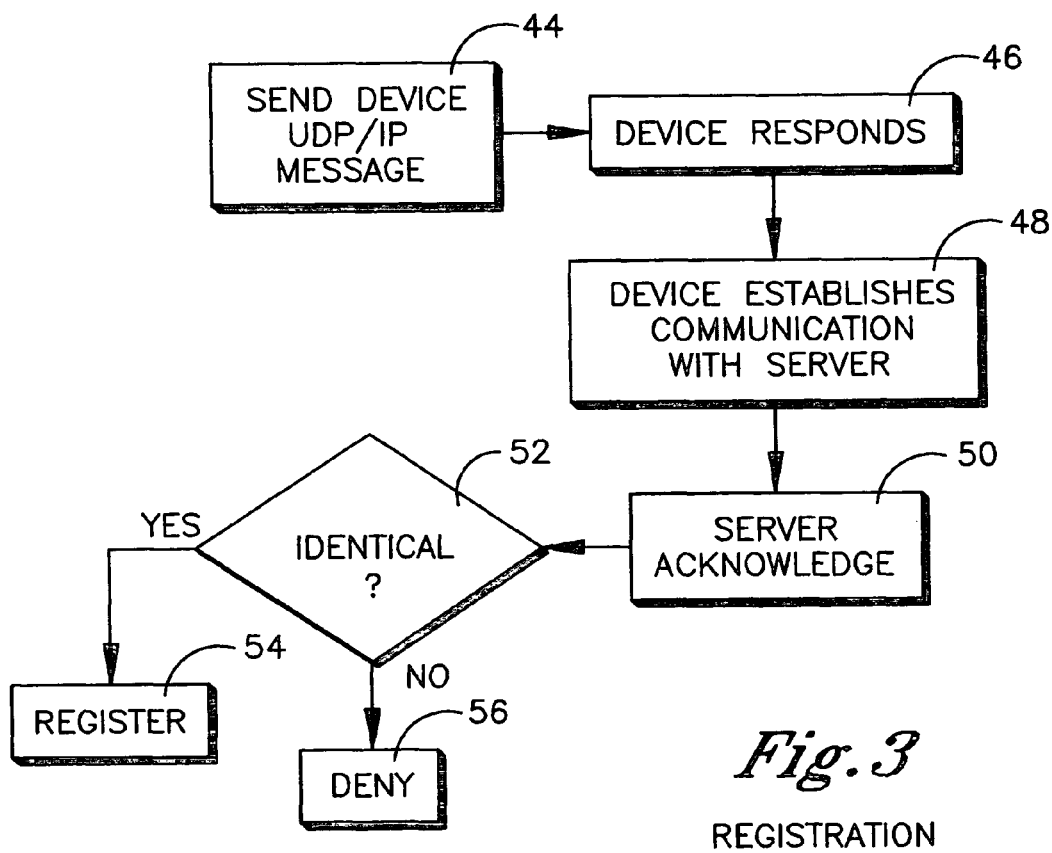
FIG. 3 is a flow chart of a non-limiting process for registration.

Turning now to FIG. 3 for an understanding of one non-limiting way to implement the registration process of block 42 of FIG. 2 after keys and other device information are received by the registration component 24 from the device 12 by RFID, at block 44 the registration component 24 broadcasts a User Datagram Protocol/Internet Protocol message requesting the new device 12 to respond. UDP or real time protocol (RTP) or other protocols can also be used. Proceeding to block 46, the device 12 responds with a UDP/IP message. At block 48 the device 12 establishes a Transmission Control Protocol/Internet Protocol (TCP/IP) communication with the registration component 24. An encrypted message is sent from the device 12 to the registration component 24. The message may include the same data transmitted by the near field communication.

Proceeding to block 50, the registration component 24 returns an acknowledgement to the device 12. The registration component 24 also compares both data. If they are identical at decision diamond 52, the device 12 is identified as the right device and registered at block 54; otherwise, registration is refused at block 56.

Figure 4:
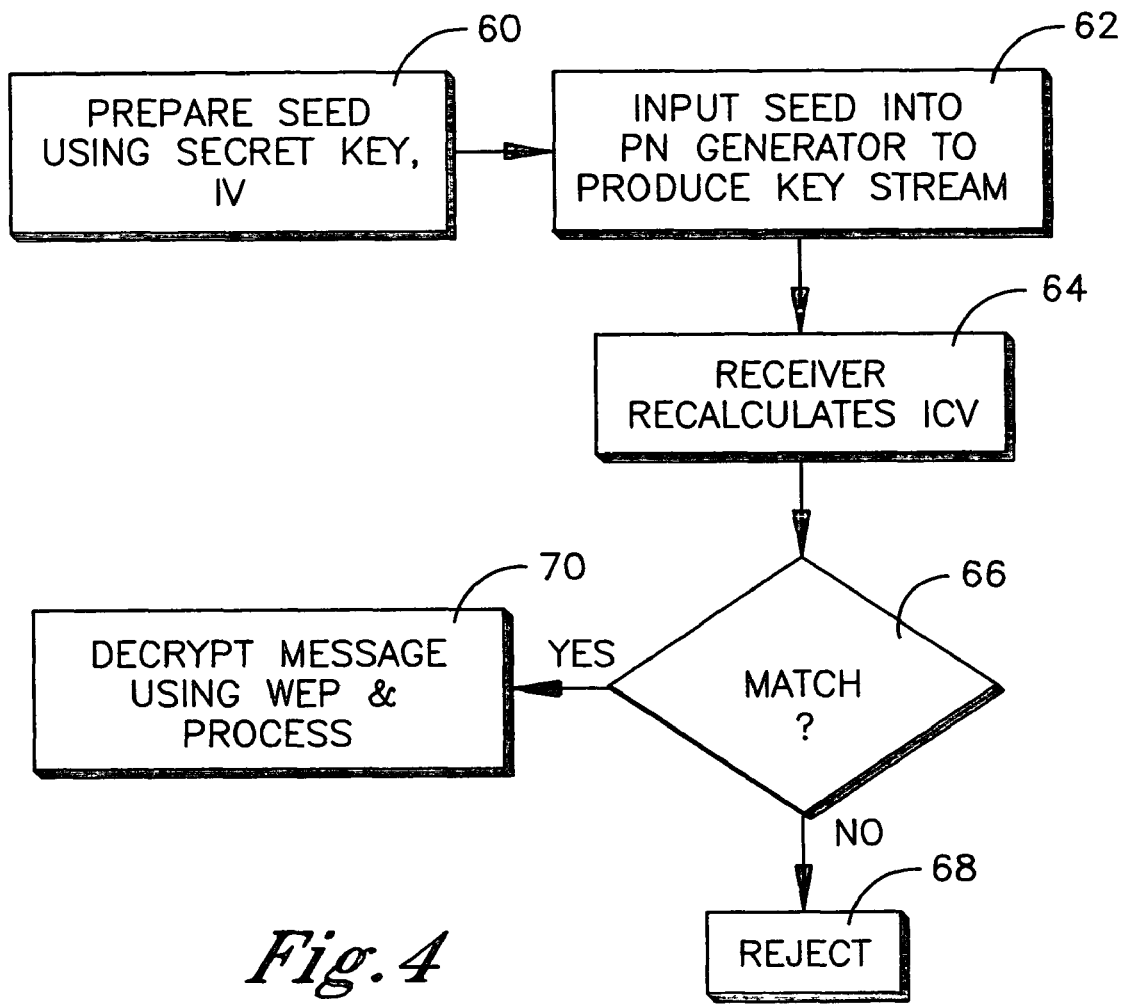
FIG. 4 is a flow chart of a non-limiting process for subsequent network communication using WEP keys.

FIG. 4 shows how the WEP keys and other information transferred to the registration component 24 by the above-described RFID process subsequently may be used. The seed mentioned above, which may also be referred to as a "key-schedule", may be prepared and stored on the RFID tag 16 as follows, or it may be prepared at block 60 prior to each message transmission as follows (in which case the below-mentioned shared secret is embedded on the RFID tag 16 and provided to the registration component 24 during the above registration process). The seed is generated by concatenating a shared secret key (supplied on the RFID tag 16 or elsewhere if a reusable seed is not pre-stored on the RFID tag 16) with a randomly-generated twenty four bit initialization vector (IV). The IV lengthens the life of the secret key because the IV can be changed for each frame transmission. Then, at block 62 the resulting "seed" is input into a pseudo-random number generator that produces a keystream equal to the length of the message frame's payload plus a thirty two bit integrity check value (ICV).

The ICV is a check sum that the receiving station recalculates at block 64 and compares to the one sent by the sending station at decision diamond 66 to determine whether the transmitted data underwent any form of tampering while in transit. If the receiving station calculates an ICV that doesn't match the one found in the frame, then the receiving station can reject the frame or flag the user at block 68; otherwise, the message is decrypted and processed at block 70.

WEP specifies a shared secret key (forty bits or sixth four bits in length) to encrypt and decrypt data. Some implementations also use 128 bit keys (known as "WEP2"). Other implementations can use keys of other lengths, e.g., AES can use 64, 128, or 196 bit keys. With WEP, the receiving station must use the same key for decryption, requiring each node in the network to be configured with the same key. It is this configuration that is automatically done herein using RFID, relieving the user of having to manually program each device 12, 14 sought to be registered.

In non-limiting implementations, before transmission takes place, the keystream may be combined with the payload/ICV through a bitwise XOR process, which produces ciphertext (encrypted data). The IV can be included in the clear (unencrypted) within the first few bytes of the frame body. The receiving station uses this IV along with the shared secret key supplied by the above-described RFID process to decrypt the payload portion of the frame body.

If desired, the sending station can use a different IV for each frame, although as mentioned above a single seed may be initially supplied on the RFID tag 16 and re-used. When transmitting messages having a common beginning, such as the "FROM" address in an e-mail, the beginning of each encrypted payload is equivalent when using the same key. After encrypting the data, the beginnings of these frames are the same, offering a pattern that can aid hackers in cracking the encryption algorithm. Accordingly, using a different IV for most frames, this type of attack can be foiled. The frequent changing of IVs also improves the ability to safeguard against someone compromising the data.

It should be noted that RFID tag data itself can be encrypted so that is can be read only by a RFID reader writer that supports decryption. For example, when Felica is used, it can be used in the clear or encrypted. In one implementation, the method above may be implemented "in the clear" inside the Felica NVM using the near field as protection against outside listeners. Alternatively, when, for instance, Suica cards are used, the Felica encryption is enabled, in effect establishing a "link layer" protection as opposed to protection at the application layer such that all the data on the card, token, etc. is scrambled to everyone except a Felica Reader/Writer that is licensed for decryption.

While the particular SYSTEM AND METHOD FOR RFID TRANSFER OF MAC, KEYS is herein shown and described in detail, it is to be understood that the subject matter which is encompassed by the present invention is limited only by the claims.

What is claimed is:
1. A method for registering a device in a network:
the device being engaged with a RFID tag storing at least a MAC address and at least one encryption data unit on a RFID tag, the method comprising:
with the device positioned sufficiently close to a network registration component having an associated RFID writer/reader to enable the writer/reader to obtain the MAC address and encryption data unit; receiving at the network registration component over RFID at least the MAC address and encryption data unit from the device;
sending from the registration component a message using a non-RFID protocol requesting the device to respond;

receiving from the device responsive to the message a response in a non-RFID protocol, the response containing substantially the same data received by the network registration from the device component over RFID; and comparing information received from the device over RFID with information received from the device in the non-RFID protocol and responsive thereto determining whether to grant the device registration, wherein the device is a video disk player or digital video recorder, the network is a home network, and the RFID reader/writer is a licensed RFID reader/writer.

2. The method of claim 1, wherein the encryption data unit is a WEP key or a WEP seed or a shared secret useful for generating a WEP seed.

3. The method of claim 1, wherein the RFID tag is not encrypted.

4. The method of claim 1, wherein the RFID tag is encrypted.

5. The method of claim 1, wherein the writer/reader is mounted on a housing of the registration component.

6. The method of claim 1, wherein the writer/reader is tethered to a housing of the registration component by a cable.

7. A device for a network, comprising:

a case; and an RFID tag in the case and bearing a MAC address unique to the device and at least one encryption data unit, wherein the tag is readable by a RFID writer/reader to enable a network registration component to obtain the MAC address and encryption data unit to permit registration of the device on the network; wherein a seed and/or a shared secret is embedded on the RFID tag and provided to the network registration component pursuant to registration of the device with the network component process, the seed being generated by concatenating the shared secret with a randomly-generated initialization vector (IV), the IV being changed for each frame transmission, the resulting seed being input into a pseudo-random number generator that produces a keystream equal to a length of a payload of a message sent from the device to the network registration component, plus a check sum that a receiver recalculates and compares to the check sum received to determine whether transmitted data underwent tampering, and responsive to the receiver calculating a check sum for a frame that doesn't match the check sum received in the frame, the receiver rejecting or otherwise flagging the frame, and responsive to responsive to the receiver calculating a check sum for a frame that matches the check sum received in the frame, the receiver decrypting and processing the frame, wherein the network component is a video disk player or digital video recorder, the network is a home network, and the RFID reader/writer is a licensed RFID reader/writer.

8. The method of claim 7, comprising a visual aid indicating an approximate location of the RFID tag within a case of the device.

9. The device of claim 8, wherein the encryption data unit is a WEP key or a WEP seed or a shared secret useful for generating a WEP seed.

10. The device of claim 8, wherein the RFID tag is encrypted.

11. The device of claim 8, wherein the RFID tag is not encrypted.

12. The device of claim 8, wherein the tag is mounted on a housing of the device.

13. The device of claim 8, wherein the tag is tethered to a housing of the device.

14. The device of claim 8, comprising a visual aid indicating an approximate location of the RFID tag within a case of the device.

15. A registration component for automatically registering a device with a network without requiring a user to enter a device ID or key into the component, comprising:

a housing;

a processor in the housing; and an RFID writer/reader engaged with the housing and connected to the processor for obtaining at least a MAC address and at least one encryption data unit from an RFID tag on the device, the processor using information from the reader/writer to register the device on the network, wherein the processor receives from the device a pseudo-randomized key stream equal to a length of a payload of a message sent from the device to the network registration component, plus a check sum that the processor recalculates and compares to the check sum received to determine whether transmitted data underwent tampering, and responsive to a determination that that a check sum calculated for a frame doesn't match the check sum received in the frame, the processor rejects or otherwise flags the frame, and responsive to a match, the processor decrypts and processes the frame, wherein the device is a video disk player or digital video recorder, the network is a home network, and the RFID reader/writer is a licensed RFID reader/writer.

16. The registration component of claim 15 wherein the encryption data unit is a WEP key or a WEP seed or a shared secret useful for generating a WEP seed.

17. The registration component of claim 15 wherein the RFID tag is encrypted.

18. The registration component of claim 15 wherein the RFID tag is not encrypted.

19. The registration component of claim 15 wherein the writer/reader is mounted on a housing of the registration component.

20. The registration component of claim 15 wherein the writer/reader is tethered to a housing of the registration component by a cable.

* * * * *